United States Patent [19]

Blackburn

[11] Patent Number: 5,410,913
[45] Date of Patent: May 2, 1995

[54] REMOTE INDICATING LIQUID LEVEL SENSOR

[75] Inventor: David A. Blackburn, Wakefield, R.I.

[73] Assignee: Thomas G. Faria Corporation, Uncasville, Conn.

[21] Appl. No.: 167,766

[22] Filed: Dec. 15, 1993

[51] Int. Cl.⁶ ............................................. G01F 23/72
[52] U.S. Cl. ....................................... 73/313; 73/320; 200/84 C; 338/33
[58] Field of Search ................. 73/308, 313, 319, 320, 73/DIG. 5; 200/84 C; 338/33

[56] References Cited

U.S. PATENT DOCUMENTS

| | | | |
|---|---|---|---|
| 1,304,022 | 5/1919 | Cole | 73/313 |
| 1,529,470 | 3/1925 | Dowd | 200/84 C |
| 1,552,373 | 9/1925 | Winterhoff | 338/33 |
| 3,113,282 | 12/1963 | Coleman | 338/33 |
| 3,709,038 | 1/1973 | Werner | 73/313 |
| 3,976,963 | 8/1976 | Kübler | 73/313 X |
| 5,148,709 | 9/1992 | Ross, Jr. | 73/320 |

FOREIGN PATENT DOCUMENTS

| | | | |
|---|---|---|---|
| 0864647 | 5/1941 | France | 73/320 |
| 1125071 | 10/1956 | France | 73/320 |
| 2758379 | 11/1978 | Germany | 338/33 |

Primary Examiner—William A. Cuchlinski, Jr.
Assistant Examiner—Willie Morris Worth
Attorney, Agent, or Firm—Hopgood, Calimafde, Kalil & Judlowe

[57] ABSTRACT

For liquid-level sensing in a tank, the invention provides a tank-mounted first subassembly that is adapted for suspension of a vertical guide from the top of the tank, such that a guided float may coact with an elongate vertical ribbon, to angularly displace a magnetic element carried by the upper end of the ribbon. The tank-mounting of this first subassembly completes closure of the tank and its contents, and closure structure of this first subassembly assures containment of the ribbon and its magnetic element within the closed volume of the tank. A second subassembly of magnetically responsive electrical means is encapsulated by a housing which is detachably connectable to the closure structure of the first assembly, solely by access that is external to the closed tank. Electrical output of the second subassembly is flexibly available to remote indicating and/or monitoring circuitry which forms no part of the invention.

20 Claims, 2 Drawing Sheets

REMOTE INDICATING LIQUID LEVEL SENSOR

BACKGROUND OF THE INVENTION

The invention relates to a device for sensing liquid level in a tank and having signal-generating means for remote indication and/or monitoring of instantaneous liquid level. More particularly, the invention relates to such a device wherein mechanical simplicity, electrical simplicity, safety and reliability are significant factors.

U.S. Pat. Nos. 4,724,706, 4,838,083, and 4,970,896 disclose liquid-level sensing devices which are vertically elongate to define a straight vertically guided path of movement for an annular float which continuously assumes the level of liquid, such as gasoline, in a tank. Float-guidance structure is adapted for suspension from the top of the tank, and instantaneous liquid level is displayed and externally viewable at the top of the device, as an indicator needle which swings in a horizontal plane, against an inscribed scale. The needle is the horizontally bent upper arm of an elongate vertical ribbon along which the float can slide; the vertical ribbon is twisted along its length, to the extent of a given fraction of a full turn, and the float is so keyed to the ribbon that the ribbon and, therefore, also the indicator needle are angularly displaced in accordance with the instantaneous elevation of the float. There is no suggestion of or provision for remote transmission of instantaneous liquid-level data, which must be locally viewed in the devices of these patents.

For remote transmission of liquid-level data, other quite different arrangements exist on the market, and the "STW" sender device of Isspro, Inc., of Portland, Oreg., is illustrative. The Isspro device comprises a free-flooding elongate tube for vertical installation within a tank, there being suitable upper-flange formations at the upper end of the tube for suspension of the same from the top of the tank. An elongate printed-circuit board within the tube mounts a vertically arrayed succession of magnetic-reed switches and resistors at discrete vertical intervals, and a float guided within the tube carries a magnet to actuate successive switches in response to changes of float position. The resistors and switches are so interconnected that an output signal indicative of liquid level is available at a remote location via flexible cabling connected to the upper end of the tube. When the liquid in the tank is a fuel, there is an important question of safety, in that the switches are circuit elements that must operate in fully immersed condition and in fuel-rich vapor above the instantaneous liquid level. Admittedly, these switches are individually encapsulated, but their susceptibility to damage poses the safety question.

BRIEF STATEMENT OF THE INVENTION

It is the primary object of the invention to provide a liquid-level sensor of the general character indicated, namely, for remote signalling of instantaneous liquid level, wherein any and all electrical components are self-contained external to the tank in which the sensor is installed.

It is a specific object to achieve the above object without mechanical or electrical connection of operative parts of a float-operated device on the one hand and, on the other hand, a signal-generator device for remote-signal transmission.

Another specific object is to achieve the above objects in a combination of two independent self-contained subassemblies, namely, a float-operated mechanical device and a signal-generating electric device wherein magnetic coupling is the sole means of float-driven control of the signal-generating device.

The invention in a preferred embodiment achieves these objects in a construction in which a tank-mounted first subassembly is adapted for suspension of a vertical guide from the top of the tank, such that a guided float may coact with an elongate vertical ribbon, to angularly displace a magnetic element carried by the upper end of the ribbon. The tank-mounting of this first subassembly completes closure of the tank and its contents, and closure structure of this first subassembly assures containment of the ribbon and its magnetic element within the closed volume of the tank. A second subassembly of magnetically responsive electrical means is encapsulated by a housing which is detachably connectable to the closure structure of the first assembly, solely by access that is external to the closed tank. Electrical output of the second subassembly is flexibly available to remote indicating and/or monitoring circuitry which forms no part of the invention.

DETAILED DESCRIPTION OF THE INVENTION

A preferred embodiment of the invention will be described in detail, in conjunction with the accompanying drawings, in which.

Figure 1:
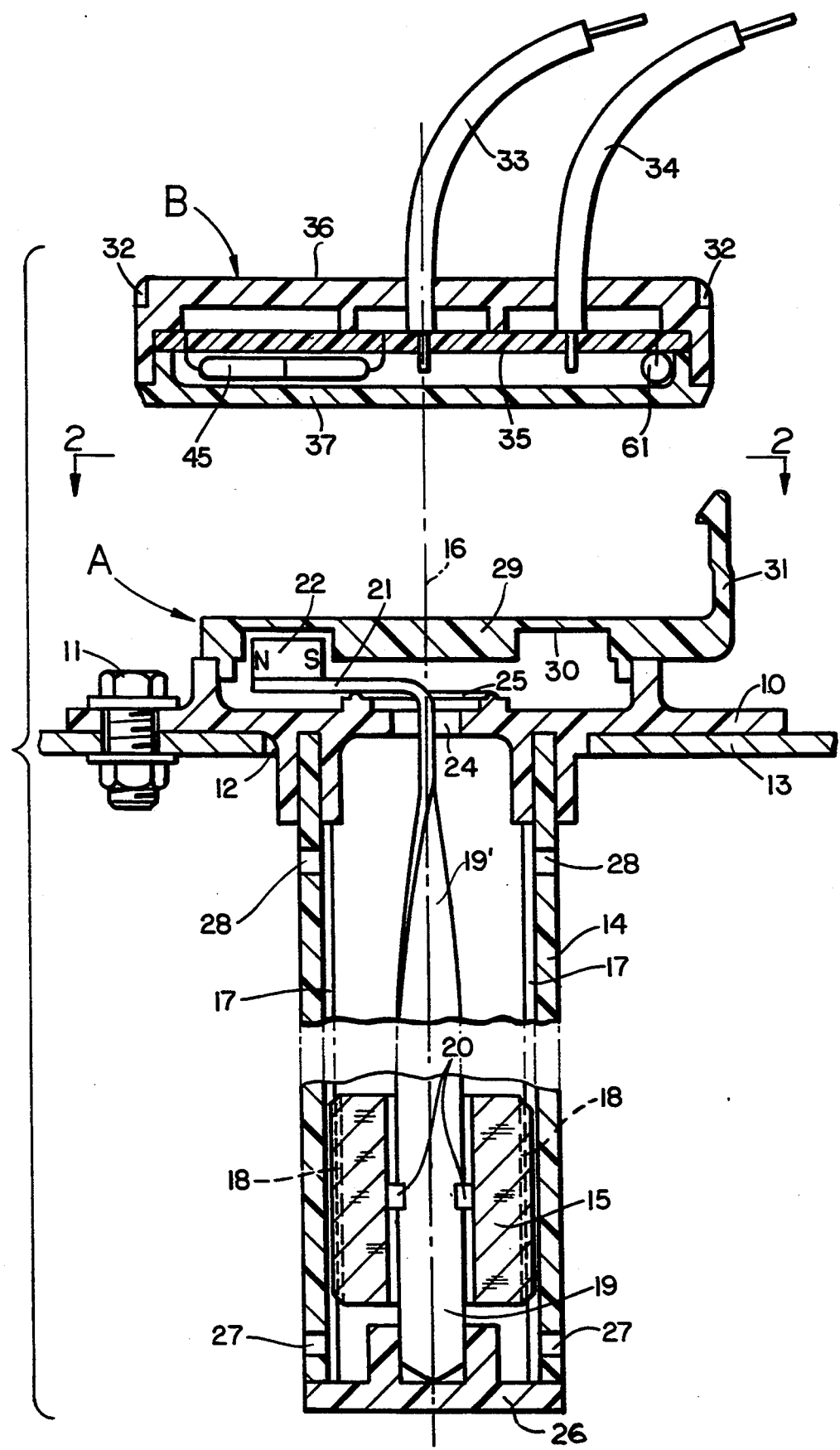
FIG. 1 is a vertical section through lower and upper subassemblies of a remote-signalling liquid-level sensor, wherein the respective subassemblies are detachably securable to each other but are shown in exploded relation.

In FIG. 1, a liquid-level sensor device of the invention is seen to comprise a lower subassembly A of enclosed mechanically movable parts and an upper subassembly B of enclosed electrical components which are fixedly mounted with respect to each other. The lower subassembly A includes means such as a radially flanged closure element 10 for mounting, as by bolt means 11, to an opening 12 in a local part of the top 13 of a tank for containment of liquid such as a fuel. An elongate tubular guide 14 is suspended from closure element 10 and will be understood to be of effective vertical extent to permit a float member 15 to have a vertical path of slidably guided movement of such extent as to reflect a desired range of liquid-level sensing in the tank, via the instantaneous vertical position of the float.

The guide tube 14 establishes a vertical axis 16 of float travel, and one or more elongate ribs 17 in the bore of tube 14 coact with one or more elongate grooves 18 in the periphery of float 15 to control angular orientation of the float throughout the full course of its displaceability. An elongate stiff ribbon element 19 has slidably keyed engagement to the central region of float 15, as at key lugs 20, and ribbon 19 is formed with a bent radially directed arm 21 at its upper end. A polarized magnetic element 22 is mounted to arm 21 at radial offset from the central axis 16, and the preferred orientation of magnetic element 22 is radial with respect to axis 16, as indicated by N-S legends in the drawing.

The guided relation of ribbon 19 to float 15 and of float 15 to the guide rib or ribs 17 of tube 14 is such that float elevation determines angular displacement of ribbon 19 and thus also of magnetic element 22, about the central axis 16. This can be realized if ribbon 19 is formed with a continuous twist for its full effective length, as suggested at the upper region 19' of ribbon 19 in FIG. 1, while the rib-to-groove relation 17-18 is straight and vertical. Alternatively, the rib-to-groove relation 17-18 may be one of continuous helical development for the full effective length of float travel, while the elongate vertical extent of ribbon 19 is flat and untwisted, as suggested in the lower region of ribbon 19 in the drawing. Still further alternatively, more gentle helically developed coaction may be provided both for the rib-to-groove relation and for the float-to-ribbon relation. In all these possible relationships, the angularly displaced position of magnet 22 will reflect instantaneous float response to liquid level.

The angular displaceability of ribbon 19 and its arm 21 are shown to be facilitated by a central bore 24 in closure member 10, serving a radial-bearing function for the upper end of ribbon 19, and a circumferentially continuous annular-land formation 25 in closure member 10 provides smoothly continuous thrust-bearing gravitational support for ribbon 19 via its arm 21, whatever the angular position of the arm. At its lower end, ribbon 19 will be understood to derive freely rotatable radial-bearing stability from the upstanding bore of a bottom-closure part 26 of tube 14.

The tubular guide 14 not only serves the described central guidance and rotary function for the mechanically movable parts 15 and 19 contained therein. It also provides a rugged housing for these mechanically movable parts and is shown, by ports 27, 28, to be free-flooding with the liquid of tank contents, with an important measure of protection against erroneous displacement of magnet 22 in the possible event of "sloshing" wave action within the tank.

Figure 2:
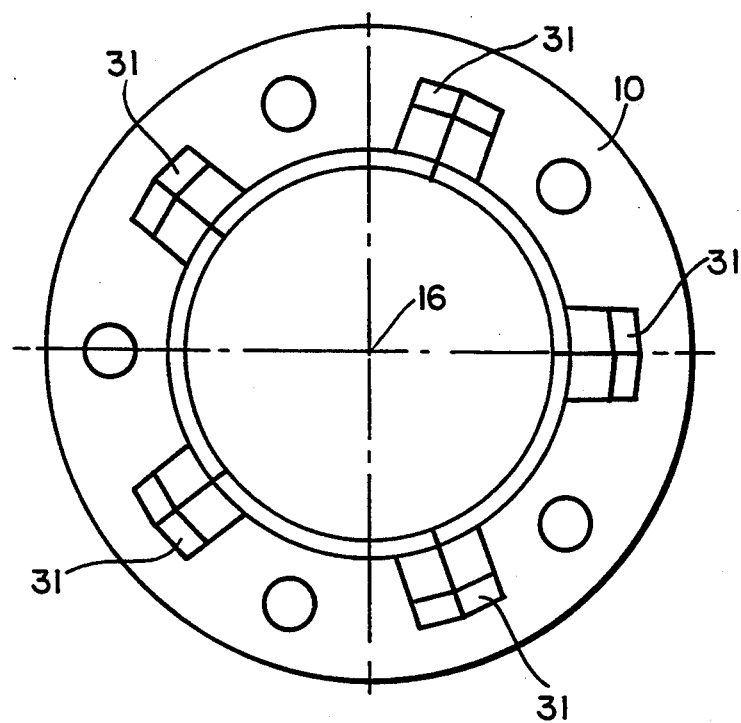
FIG. 2 is a plan view of the externally exposed part of the lower subassembly of FIG. 1, the view being taken at the plane 2—2 of FIG. 1.

Description of the lower subassembly A is completed by identifying a top closure panel 29 which is circumferentially fitted and sealed to closure flange member 10, as by adhesive or other bonding. Panel 29 will be seen to be internally contoured to provide a clear annular recess or cavity 30 within which magnetic element 22 can freely move, and the panel thickness above this annular recess is relatively thin, to allow a relatively strong magnetic field of element 22 to be established adjacent panel 29 but external to the tank. Finally, integrally formed snap fingers or lugs 31 are provided at angularly spaced locations around panel 29, for permanent or detachable engagement to coacting notch formations 32 of the subassembly B when the latter is assembled to subassembly A. In FIG. 2, five spaced snap-finger formations 31 are seen, angularly spaced about the central axis 16; for simplicity, only one of the plural snap-finger formations 31 is shown in FIG. 1.

As generally noted above, subassembly B provides a fully enclosed package of electrical components producing an output signal via flexible insulated leads 33, 34, to a remote location (not shown) for liquid-level indication and/or monitoring. The package comprises a printed-circuit board 35 of electrical components, nested and sealed within permanently fitted upper and lower container halves 36, 37.

Figure 3:
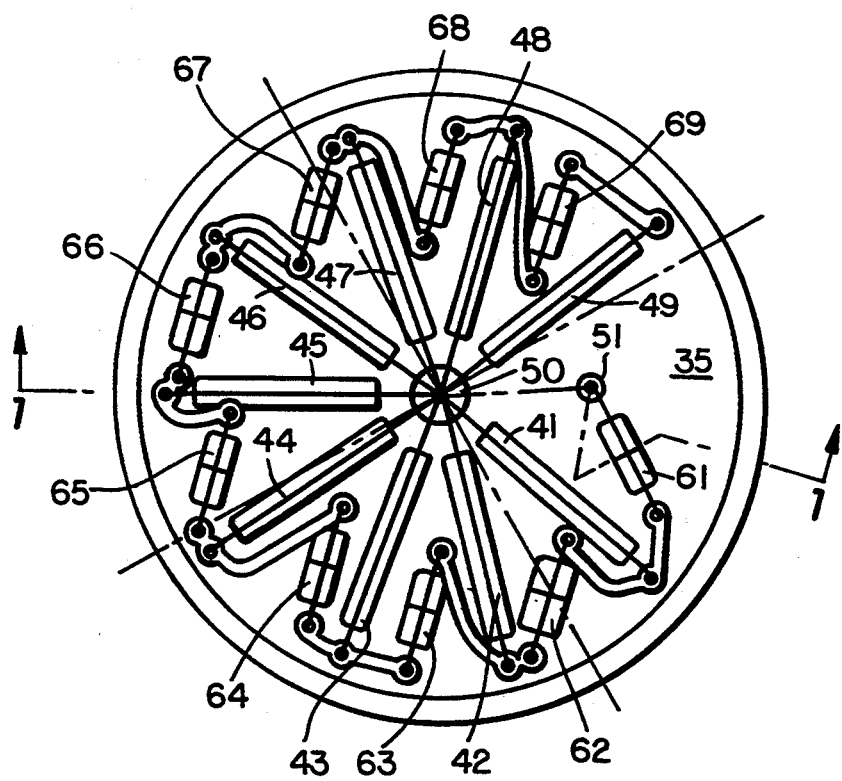
FIG. 3 is a plan view of the underside of a circuit board contained within the upper subassembly of FIG. 1, the section of said upper subassembly in FIG. 1 being indicated at 1—1 in FIG. 3.

In FIG. 3, the circuit board 35 is seen to be equipped with a plurality of encapsulated magnetic-reed switches 41, 42 . . . 49 in angularly spaced radially oriented array about the center, which, when subassemblies A and B are assembled to each other, is coincident with the central axis 16. As shown, a central terminal 50 is the common connection to one terminal of each of the switches 41, 42 . . . 49, and this central terminal is served by the external flexible line 33. The other flexible line 34 serves one end of an electrical resistor, at terminal 51 on the circuit board. The electrical resistor is effectively a multi-tap resistor, wherein a succession of separate resistor elements 61, 62 . . . 69 are series-connected to each other, and wherein each resistor-element terminal is also connected to the remaining terminal of one of the switches 41, 42 . . . 49.

The strength of the polarized magnetic element 22 is so selected, in terms of the radial orientation and field-response properties of the magnetic-reed switches, that float-driven angular displacement of magnetic element 22 will always bring the polarized field within switch-operating reach of one of the magnetic-reed switches, and also such that the one switch which has been thus magnetically actuated, e.g., from its normally open (NO) state to its closed state, will retain the closed state until the next switch is similarly actuated, in response to an angular displacement of magnetic element 22. Thus, when switch 41 is actuated to closed position (to the exclusion of actuating all other switches), the electrical resistance signal across the remote lead lines 33, 34 is solely the resistance value of resistor 61, and when switch 42 is actuated to closed position (to the exclusion of actuating all other switches), the resistance across remote lead lines 33, 34 is solely the sum total of the resistance values of resistors 61, 62. And so on, throughout the range of angular displaceability of ribbon arm 21 and its magnetic element 22.

The housing and end closures of the lower subassembly (A) and the housing and circuit-board substrate of the upper subassembly (B) are of magnetically transparent material, the housing components being suitably of nylon, which is a low-friction material, adequate to the radial-bearing and thrust-bearing purposes noted above for mechanical movement within subassembly A. The float material may also be of plastic but with sufficient air or other gas bubble content to provide requisite buoyancy.

A significant advantage of the present invention is that subassembly B comprises a single geometric array of reed switches mounted on a single universal printed circuit board which can be used to monitor liquid level for any depth and configuration of tank. Further, subassembly A can be manufactured in a variety of configurations to accommodate different methods of mounting to the top closure of the tank, and the single subassembly B can be mounted to any of the configurations of subassembly A. Existing-art reed-switch level senders require a unique switch array and a unique length printed circuit board for each different tank depth and geometry.

What is claimed is:

1. A liquid-level sensor device adapted for mounting to an opening in a tank and for use in remotely indicating instantaneous level of liquid in the tank, comprising:
   a first level responsive subassembly of non-electrical components adapted for mounting to the tank for containment within the tank and for closure of the tank opening, said first subassembly including a float for producing a mechanical displacement of a magnetic element as a function of sensed liquid level;

a second subassembly of electrical components having means responsive to the instantaneous displaced position of said magnetic element and adapted to produce an output for remote transmission of a signal from said electrical components; and cooperating means on said first and second assemblies for external mounting of said second assembly to said first assembly, whereby all electrical components can be external to a closure of the tank.

2. The liquid-level sensor device of claim 1, in which said subassemblies have coacting formations for detachably mounting said second subassembly to said first subassembly.

3. A liquid-level sensor device for use in remotely indicating instantaneous level of liquid in a tank that has an opening adapted for closure at the top portion thereof, said device comprising:

a first level-responsive subassembly of non-electrical components adapted for mounting to said opening and for suspension from the top portion of the tank and including a float, coacting with means to displace a polarized magnetic element about a vertical axis as a function of sensed liquid level; and a second electric-component subassembly having magnetic field-sensitive means responsive to an angular position of said magnetic element and adapted to produce an output for remote transmission of a signal from said electrical components;

said first assembly being adapted for mounting to and closure of said top portion of the tank, said second subassembly having means for mounting the same to said first subassembly at the location of top closure of the tank and within the field of said magnetic element and external to the tank, and cooperating means on said first and second assemblies for retaining a mounting of said subassemblies to each other.

4. The liquid level sensor device of claim 3, in which said cooperating means on said subassemblies have coacting formations for detachably mounting said second subassembly to said first subassembly in an alignment such that the angular position sensed by said second subassembly is angular about said axis.

5. The liquid-level sensor device of claim 3, in which said magnetic element is polarized in a direction that is radial about said axis.

6. The liquid-level sensor device of claim 3, in which said magnetic field-sensitive means comprises a fixed array of plural magnetic-reed switches angularly distributed about a central axis which coincides with said vertical axis when said subassemblies are mounted to each other, and an electrical resistor progressively tapped by successive of said switches, whereby said output signal is an electrical resistance value which is proportional to the angle at which a particular one of said switches responds to angular proximity of said polarized magnetic element and therefore to an instantaneously sensed corresponding value of liquid level in the tank.

7. The liquid-level sensor device of claim 3, in which said first subassembly includes an elongate floodable tubular guide concentric with said vertical axis, said guide being vertically elongate and extending from a lower end to an upper end, said float deriving stability for buoyant displacement within said guide, a tank-mounting formation at the upper end of said guide, and an enclosure for said magnetic element with freedom of magnetic-element displacement about said axis, said tubular guide and said float and said tank-mounting formation and said enclosure being of magnetically transparent material.

8. The liquid-level sensor device of claim 7, in which said material is a plastic material.

9. The liquid-level sensor device of claim 7, in which said means to displace the magnetic element is a vertically elongate stiff ribbon which is slidably keyed centrally to said float and which is bent at its upper end in a radial direction away from said axis, said magnetic element being mounted to said bent upper end.

10. The liquid-level sensor device of claim 3, in which said first subassembly includes an elongate floodable tubular guide concentric with said vertical axis, said guide being vertically elongate and extending from a lower end to an upper end, said float deriving stability for buoyant displacement within said guide, a tank-mounting formation at the upper end of said guide, and in which said means to displace the magnetic element is a stiff ribbon having a vertically elongate portion which is slidably keyed centrally to said float, said ribbon being bent at its upper end into a radial formation that is directed away from said axis, said magnetic element being mounted to said bent upper end, said tank-mounting formation including a central radial-bearing formation for ribbon rotation about said axis.

11. The liquid-level sensor device of claim 10, in which a circumferentially continuous annular land formation at the upper end of said guide is concentric about said axis for gravitational thrust-bearing support of the bent upper end of said ribbon.

12. The liquid-level sensor device of claim 10, in which said tubular guide includes a bottom closure formed for radial-bearing coaction with a lower end of said ribbon.

13. The liquid-level sensor device of claim 7, in which said guide and said float have slidably engaged coacting formations determining the angular orientation of said float throughout a guide path of buoyed float displaceability.

14. The liquid-level sensor device of claim 10, in which the vertically elongate portion of said ribbon is formed with a helical twist, advancing in a single rotary direction as a function of liquid level.

15. The liquid-level sensor device of claim 3, in which said second electric-component subassembly comprises a circuit board and a plurality of magnetic-reed switches in radially outward angularly spaced orientation on said circuit board and about said vertical axis when said subassemblies are mounted to each other, said switches having a first-lead connection in common for one output-signal terminal connection, and said switches having second-lead connections, a plurality of resistors mounted to said circuit board, said resistors being connected in series to a second output-signal terminal, with the second-lead connections of successive of said switches being established to successive interconnections between resistors of said series.

16. The liquid-level sensor device of claim 15, in which said circuit board is mounted in a housing of magnetically transparent material, fully enclosing and sealing said circuit board and its interconnected switches and resistors.

17. The liquid-level sensor device of claim 16, in which said circuit board and said housing are generally circular about said vertical axis.

18. In combination, a tank for liquid containment and having an upper opening, and liquid-level sensor means mounted to said tank and closing said opening;

said sensor means comprising a first level-responsive subassembly of non-electrical components mounted to said tank and including components extending into and contained within said tank, said non-electrical components including a float for producing mechanical displacement of a magnetic element as a function of sensed liquid level;

a second subassembly of electrical components having means responsive to the instantaneous displaced position of said magnetic element and adapted to produce an output for remote transmission of a signal from said electrical components; and cooperating means on said first and second subassemblies for external mounting of said second subassembly to said first subassembly, whereby all electrical components are external to the closure of the tank.

19. The combination of claim 18, in which said cooperating means on said subassemblies have coacting formations for detachably mounting said second subassembly to said first subassembly.

20. A kit of liquid-level sensor components for assembly to a tank at an opening in the tank, said kit comprising:

(a) a first level-responsive subassembly of non-electrical components including mounting means adapted for mounting said subassembly to the tank and for closing the opening in the tank, said first subassembly including components which when mounted will extend into and be contained within the tank, said non-electrical components including a float for producing a mechanical displacement of a magnetic element as a function of sensed liquid level; and (b) a second subassembly of electrical components adapted for mounting to an externally exposed side of said first subassembly and having means responsive to the instantaneous displaced position of said magnetic element and adapted to produce an output for remote transmission of a signal from said electrical components; and cooperating means on said subassemblies for mounting the second subassembly to the externally exposed side of said first subassembly.

\* \* \* \* \*